US008142096B2

(12) United States Patent  (10) Patent No.: US 8,142,096 B2
Leung et al.                    (45) Date of Patent: Mar. 27, 2012

(54) COMPUTER-CONTAINED BINDER

(75) Inventors: Chee-Chun Leung, Taoyuan Shien (TW); Yuan-Chen Liang, Taoyuan Shien (TW); Chia-Hui Wu, Dalin Township, Chiayi County (TW); Yi-Chun Lin, Rueifang Township, Taipei County (TW)

(73) Assignee: Quanta Computer Inc., Taoyuan Shien (TW)

( * ) Notice: Subject to any disclaimer, the term of this patent is extended or adjusted under 35 U.S.C. 154(b) by 305 days.

(21) Appl. No.: 12/588,338

(22) Filed: Oct. 13, 2009

(65) Prior Publication Data

US 2010/0310302 A1      Dec. 9, 2010

(30) Foreign Application Priority Data

Jun. 8, 2009  (TW) .............................. 98210138 U

(51) Int. Cl.
*B42F 3/00* (2006.01)
*B42F 13/00* (2006.01)
*B42F 13/12* (2006.01)
*B42F 13/40* (2006.01)
*G09B 5/00* (2006.01)

(52) U.S. Cl. .............. 402/4; 402/80 R; 402/79; 434/317
(58) Field of Classification Search ................ 402/4, 79, 402/80 R; 434/317
See application file for complete search history.

(56) References Cited

U.S. PATENT DOCUMENTS

| 5,109,354 | A | * | 4/1992 | Yamashita et al. ....... 361/679.41 |
| 5,219,239 | A | * | 6/1993 | Bianco ............................ 402/79 |
| 5,295,758 | A | * | 3/1994 | Bianco ............................ 402/79 |
| 5,476,336 | A | * | 12/1995 | Osiecki et al. ................. 402/79 |
| 5,876,144 | A | * | 3/1999 | Bedol et al. ...................... 402/4 |
| 7,540,379 | B2 | * | 6/2009 | Yau .............................. 206/320 |
| 7,854,319 | B2 | * | 12/2010 | Yau .............................. 206/320 |

* cited by examiner

*Primary Examiner* — Edward Tolan
*Assistant Examiner* — Kyle Grabowski
(74) *Attorney, Agent, or Firm* — Rabin & Berdo, PC

(57) ABSTRACT

A computer-contained binder provided in the disclosure has a document binder and a computer device. The document binder having at least one cover plate and plural parallel folder rings piercing through an edge of the cover plate. The computer device has a main body, a column-shaped battery portion pierced through by all of the parallel folder rings, and a movable arm. The movable arm has two opposite ends, in which one end thereof is fixed on one of the opposite ends of the column-shaped battery portion, and the other end thereof is movably disposed on one side of the main body.

9 Claims, 3 Drawing Sheets

COMPUTER-CONTAINED BINDER

RELATED APPLICATIONS

This application claims priority to Taiwan Application Serial Number 98210138, filed Jun. 8, 2009, which is herein incorporated by reference.

BACKGROUND

1. Field of Invention

The present disclosure relates to a document binder, and more particularly to a computer-contained binder.

2. Description of Related Art

Nowadays, paper notebooks on the market, such as organizers with paper format sizes such as A3, A4, A5, B4, and B5, and allow users (i.e. salesmen or students) to write on papers instantly. However, one of drawbacks for paper notebooks is that paper notebooks cause paper trash problems.

On the other hand, as computer products on the market becomes level up, but cheaper, these computer products are easy to enter people's life, for example, people usually use computer product as a word processing tool in theirs offices or families.

Furthermore, because a laptop computer is easy to carry, people trend to have one instead of a desktop computer. Also, computer companies put the laptop computer and a paper notebook together for a product to help users to record information by typing rather than writing.

However, since the format size of a laptop computer and that of paper notebooks are not the same, the laptop computer may be lost when the laptop computer is detached from the paper notebook.

Meanwhile, even when the laptop computer and the paper notebook are integrated together, it might be inconvenient and trouble how to place the laptop computer properly on the right hand side or the left hand side of the paper notebook.

SUMMARY

A computer-contained binder is provided in this disclosure.

The computer-contained binder comprises a document binder and a computer device. The document binder has two cover plates and some parallel folder rings piercing through an edge of the cover plates. The computer device comprises a main body, a column-shaped battery portion, and a movable arm. The column-shaped battery portion is pierced through by all of the parallel folder rings to be coupled with the document binder, and a centerline between two opposite ends of the column-shaped battery portion is parallel with the edge of the cover plates. The movable arm has a first end thereof and a second end thereof, which are opposite with each other. The first end of the movable arm is fixed on one of the opposite ends of the column-shaped battery portion, and the second end of the movable arm is movably disposed on one side of the main body.

In an embodiment, the movable arm has a first rod and a second rod. The first rod has two opposite ends thereof, in which one end of the first rod is disposed on the first end of the movable arm, is perpendicular with the column-shaped battery portion, and is driven to move with the column-shaped battery portion. The second rod has two opposite ends thereof, in which one end of the second rod is disposed on the second end of the movable arm, and is pivoted with the main body for rotating the main body with respect to the movable arm, the other end of the second rod is linearly and slidably disposed on the other end of the first rod for carrying the main body to approach or leave the column-shaped battery portion.

Thus, by rotating the column-shaped battery portion along a direction that the parallel folder rings extend, the main body of the computer device will be moved with the movable arm and the column-shaped battery portion, from one cover plate to the other cover plate. The main body may be rotated with respect to the movable arm to leave the document binder.

Also, the first rod has a first sliding track disposed on the other end of the first rod, the second rod has a second sliding track disposed on the other end of the second rod, wherein the first sliding track and the second sliding track are matched and engaged with each other. Thus, the main body can be carried to approach or leave the column-shaped battery portion by the first sliding track and the second sliding track.

In this embodiment, the main body can be a panel computer having a touch panel and a camera. The panel computer is electrically connected the column-shaped battery portion via the movable arm.

The column-shaped battery portion comprises a flange and plural through-holes. The flange is disposed on the circumference surface of the column-shaped battery portion, and is parallel to the centerline. The through-holes are arranged linearly on the flange, and are respectively pierced through by one of the parallel folder rings.

Thus, no matter the column-shaped battery portion simultaneously goes through the parallel folder rings or out of the parallel folder rings, the column-shaped battery portion is still coupled with the document binder.

One of the cover plates has a size substantially matching paper formats A3, A4, A5, B4 or B5, and the parallel folder rings are varied in different number and in different way of arrangements that the parallel folder rings are arranged with respect to the size of the cover plate.

When the size of the cover plate matches one of the paper formats, the size of the cover plate is substantially the same as the main body. Meanwhile, the through-holes provide the parallel folder rings of more than two sizes of the paper formats of the cover plate to pierce.

By combining the document binder and the computer device, the computer-contained binder is able to reduce possibilities of parting the computer device from the document binder and then losing the computer device.

By combining the document binder and the computer device, the computer-contained binder is able to provide more than one position that the computer device is placed aside the document binder for facilitating a user to read.

By combining the document binder and the computer device, the computer-contained binder is able to place the computer device on either the right or left hand side of the binder for facilitating a user who has a right or left handed writing habit to write.

By rotating the main body to change the view of a display thereof, the computer-contained binder is able to provide a main user or others beyond the main user using the display thereof.

It is to be understood that both the foregoing general description and the following detailed description are examples, and are intended to provide further explanation of the disclosure as claimed.

BRIEF DESCRIPTION OF THE DRAWINGS

These and other features, aspects and advantages of the present disclosure will become better understood with regard to the following description, appended claims and accompanying drawings where:

DESCRIPTION OF THE PREFERRED EMBODIMENTS

Figure 1:
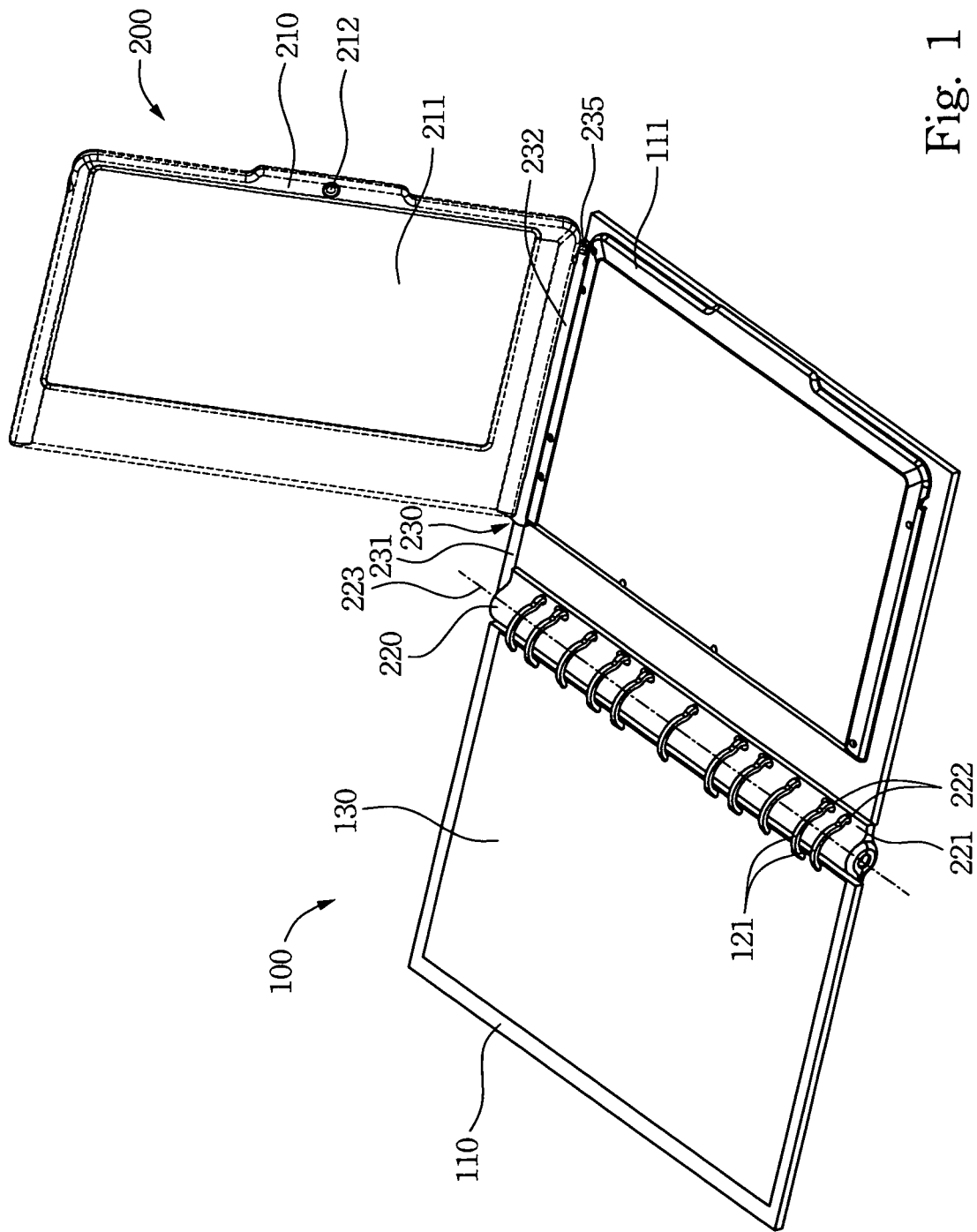
FIG. 1 is an operational view when the computer device of the computer-contained binder is operated on a right hand cover plate according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
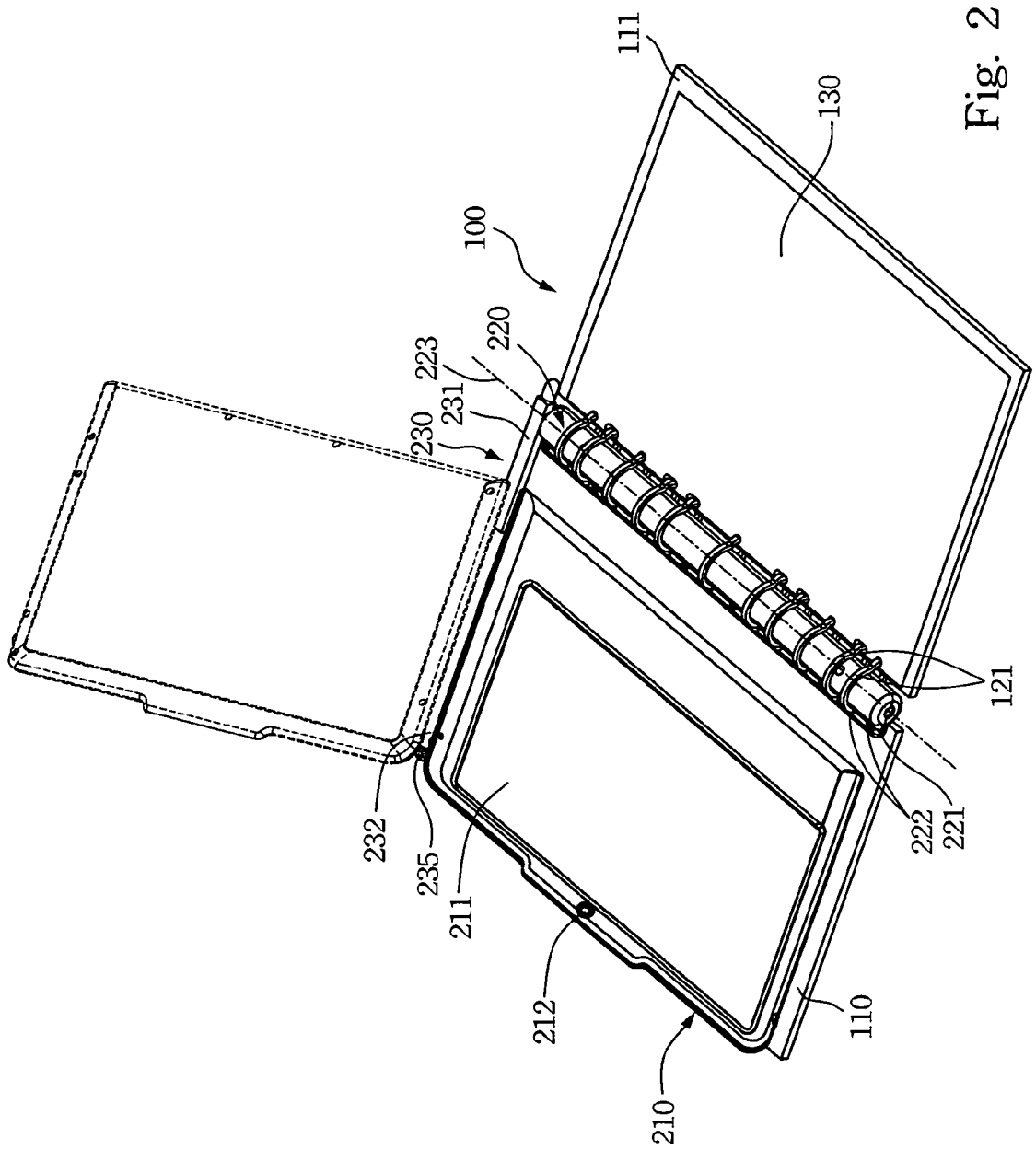
FIG. 2 is the other operational view when the computer device of the computer-contained binder is operated on a left hand cover plate according to the embodiment of the disclosure.
Figure 3:
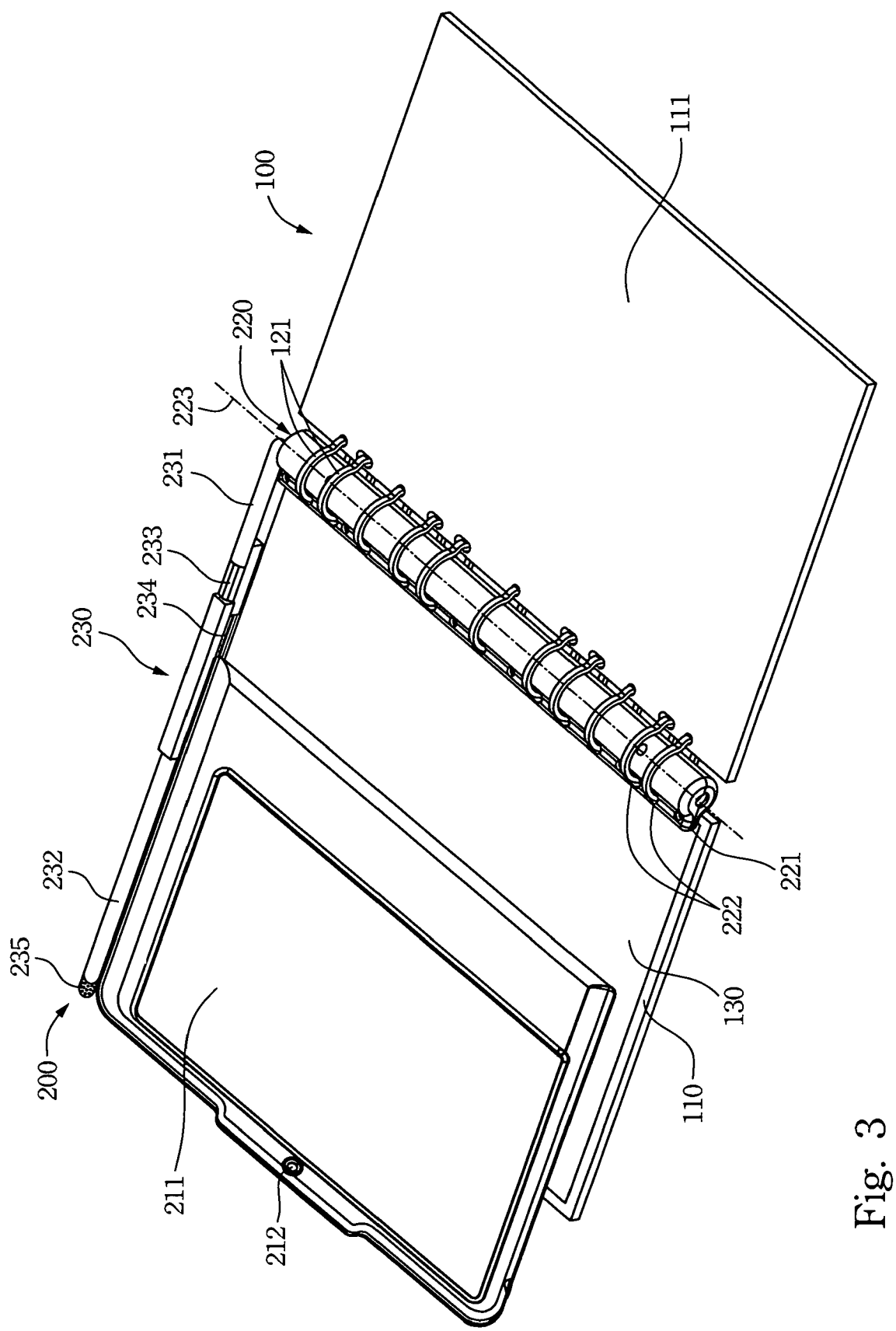
FIG. 3 is another operational view when the computer device of the computer-contained binder is sliding away the column-shaped battery portion according to the embodiment of the disclosure.

Refer to FIG. 1 to FIG. 3. FIG. 1 to FIG. 3 are different operational views when the computer device of the computer-contained binder is operated on a document binder according to an embodiment of the disclosure.

A computer-contained binder is provided in this disclosure. By combining a computer device 200 and a document binder 100, the computer-contained binder is able to reduce possibilities of parting the computer device 200 from the document binder 100 and then losing the computer device 200.

The computer-contained binder comprises a document binder 100 and a computer device 200. The document binder 100 has a left-hand cover plate 110, a right-hand cover plate 111 and some parallel folder rings 121. These parallel folder rings 121 are arranged linearly between the cover plates 110, 111, and pierce through one edge of each cover plate 110, 111 to connect them together. Thus, all inner openings of the parallel folder rings 121 are aligned with each other. These parallel folder rings 121 are used for collecting contents 130 such as loose-leaf papers, loose-leaf page type plastic bags, and books with matched holes thereon by piercing through the holes of the contents 130 loaded in the document binder 100.

Here, the document binder 100 for example, can be a paper notebook, a book, an organizer or a calendar. The parallel folder rings 121 are not limited to a breakable or unbreakable type only, and circle shaped or non-circle shaped rings.

The computer device 200 comprises a main body 210, a column-shaped battery portion 220, and a movable arm 230. The main body 210, for example, is a panel computer, is in the document binder 100. The panel computer has a display (e.g. touch panel) 211 and a camera 212, and the panel computer is electrically connected the column-shaped battery portion 220 via the movable arm 230. The column-shaped battery portion 220, for example, has a column-shaped outer case and at least one battery module (not shown in the Figures) set in the column-shaped outer case.

The column-shaped battery portion 220 is pierced through by all of the parallel folder rings 121 to be coupled with the document binder 100, and can be moved along a direction that the parallel folder rings 121 extend. Moreover, a dotted centerline 223 between two opposite ends of the column-shaped battery portion 220 is parallel with the edge of the cover plates 110, 111. The movable arm 230 has a first end thereof and a second end thereof, which are opposite with each other. The first end of the movable arm 230 is fixed on one of the opposite ends of the column-shaped battery portion 220, and the second end of the movable arm 230 is movably disposed on one side of the main body 210.

In the embodiment, the column-shaped battery portion 220 comprises a flange 221 and plural through-holes 222. The flange 221 is disposed on a circumference surface of the column-shaped battery portion, and is parallel to the dotted centerline 223 between the two opposite ends of the column-shaped battery portion 220. The through-holes 222 are arranged linearly on the flange 221, and are respectively pierced through by one of the parallel folder rings 121.

Thus, no matter the column-shaped battery portion 220 goes through the parallel folder rings 121, or the column-shaped battery portion 220 is out of the parallel folder rings 121, the column-shaped battery portion 220 still can be moved along a direction that the parallel folder rings 121 extend.

Refer to FIG. 1 and FIG. 2 again. When a user has a right-handed writing habit, the user may rotate the column-shaped battery portion 220 mentioned above to move the main body 210 from the right-hand cover plate 111 to the left-hand cover plate 110 for helping the user to write on the contents 130, vice versa.

Thus, the computer-contained binder provides users to place the computer device 200 on either right or left hand side of the document binder 100 for facilitating a user who has a right or left handed writing habit to write.

The document binder 100 has a size substantially matching paper formats A3, A4, A5, B4 or B5, and the parallel folder rings 121 are varied in different numbers and in different ways of arrangements that the parallel folder rings 121 are arranged with respect to the size of the document binder 100. Thus, when the document binder 100 is sized as one of A3, A4, A5, B4 and B5 paper formats, the size of the document binder 100 is substantially the same as the main body 210. Meanwhile, the through-holes 222 match the parallel folder rings 121 of the document binder 100 with more than two kinds of the sizes of the paper formats.

Therefore, as the main body 210 is sized similar to the document binder 100, the computer device 200 will fit in the document binder 100, rather than exposure from the document binder 100. Thus, the computer device 200 can be combined into the document binder 100 properly.

Refer to FIG. 2 again. In an embodiment, the movable arm 230 has a first rod 231 and a second rod 232. The first rod 231 has two opposite ends thereof, in which one end of the first rod 231 is disposed on the first end of the movable arm 230, and is perpendicular with the column-shaped battery portion 220. Thus, the first rod 231 is driven to move with the column-shaped battery portion 220 together, when the column-shaped battery portion 220 is rotated.

The second rod 232 has two opposite ends thereof, in which one end of the second rod 232 is disposed on the second end of the movable arm 230, and the second rod 232 is pivoted with the main body 210 for rotating the main body 210 with respect to the movable arm 230, the other end of the second rod 232 is linearly and slidably disposed on the other end of the first rod 231 for carrying the main body 210 to approach or leave the column-shaped battery portion 220.

Therefore, by rotating the column-shaped battery portion 220 along these parallel folder rings 121, the main body 210 of the computer device 200 can be rotated from one of the cover plates (e.g. right-hand cover plates 111) to the other one (e.g. left-hand cover plates 110) by using the movable arm 230. Thus, the computer-contained binder provides more than one position that the computer device 200 is placed aside the document binder 100 for facilitating a user to read.

In details, the first rod 231 has a first sliding track 233 disposed on the other end of the first rod 231, the second rod 232 has a second sliding track 234 disposed on the other end of the second rod 232, wherein the first sliding track 233 and the second sliding track 234 are matched and engaged with each other. The main body 210 can be carried to approach or leave the column-shaped battery portion 220 by the first sliding track 233 and the second sliding track 234. Thus, by rotating the main body 210 to change the view of the display 211 thereof (see FIG. 1 and FIG. 2), the computer-contained binder 100 is able to provide a main user or others beyond the main user using the display 211 thereof.

The reader's attention is directed to all papers and documents which are filed concurrently with his specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A computer-contained binder, comprising:
    a document binder having at least one cover plate and plural parallel folder rings piercing through an edge of the cover plate; and
    a computer device comprising:
    a main body;
    a column-shaped battery portion pierced through by all of the parallel folder rings to be coupled with the document binder, and having a centerline between two opposite ends of the column-shaped battery portion being parallel with the edge of the cover plate by; and
    a movable arm, comprising:
        a first rod having two opposite ends thereof, wherein one end of the first rod is fixed on one of the opposite ends of the column-shaped battery portion, and the first rod is capable of being driven to move with the column-shaped battery portion; and
        a second rod having two opposite ends thereof, wherein one end of the second rod is pivoted with one side of the main body, and the other end of the second rod is linearly and slidably disposed on the other end of the first rod.

2. The computer-contained binder of claim 1, wherein the first rod has a first sliding track disposed on the other end of the first rod, the second rod has a second sliding track disposed on the other end of the second rod, wherein the first sliding track and the second sliding track are matched and engaged with each other.

3. The computer-contained binder of claim 1, wherein the column-shaped battery portion comprises:
    a flange disposed on a surface of the column-shaped battery portion, and being parallel to the centerline; and
    plural through-holes arranged linearly on the flange, and respectively pierced through by one of the parallel folder rings.

4. The computer-contained binder of claim 3, wherein the cover plate has a size substantially matching paper formats A3, A4, A5, B4 or B5, and the parallel folder rings are varied in different numbers and in different arrangements with respect to the size of the cover plate, and the through-holes provide the parallel folder rings of more than two sizes of the paper formats of the cover plate to pierce.

5. The computer-contained binder of claim 4, wherein a size of the main body is substantially matching the size of the cover plate of the document binder.

6. The computer-contained binder of claim 1, wherein the column-shaped battery portion is electrically connected with the main body via the movable arm.

7. The computer-contained binder of claim 1, wherein the main body is a panel computer.

8. The computer-contained binder of claim 1, wherein the document binder is a paper notebook, a book, an organizer or a calendar.

9. The computer-contained binder of claim 1, wherein the column-shaped battery portion comprises:
    a column-shaped outer case; and
    at least one battery module set in the column-shaped outer case.

* * * * *